United States Patent
Bhattacharya et al.

(10) Patent No.: US 7,369,489 B1
(45) Date of Patent: May 6, 2008

(54) UNBIASED TOKEN BUCKET

(75) Inventors: Dipankar Bhattacharya, Saratoga, CA (US); Ketan A. Padwekar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 841 days.

(21) Appl. No.: 10/095,800

(22) Filed: Mar. 12, 2002

(51) Int. Cl.
*H04L 12/26* (2006.01)
*H04J 1/16* (2006.01)
*G06F 11/00* (2006.01)
*G01R 31/08* (2006.01)

(52) U.S. Cl. ............ 370/230; 370/235; 370/412; 709/227; 709/240

(58) Field of Classification Search ........ 370/229–235, 370/395–401, 414–468; 709/223–235
See application file for complete search history.

(56) References Cited

U.S. PATENT DOCUMENTS

| | | | | |
|---|---|---|---|---|
| 5,381,407 A * | 1/1995 | Chao | ............... | 370/233 |
| 5,519,704 A | 5/1996 | Farinacci et al. | ............... | 370/85.13 |
| 5,566,163 A * | 10/1996 | Petit | ............... | 370/230 |
| 5,831,971 A * | 11/1998 | Bonomi et al. | ............... | 370/230 |
| 6,002,666 A * | 12/1999 | Fukano | ............... | 370/230.1 |
| 6,032,272 A | 2/2000 | Soirinsuo et al. | ............... | 714/706 |
| 6,198,743 B1 | 3/2001 | Giroux et al. | ............... | 370/395 |
| 6,229,788 B1 * | 5/2001 | Graves et al. | ............... | 370/230 |
| 6,320,845 B1 * | 11/2001 | Davie | ............... | 370/230 |
| 6,363,053 B1 * | 3/2002 | Schuster et al. | ............... | 370/230 |
| 6,381,214 B1 * | 4/2002 | Prasad | ............... | 370/230.1 |
| 6,404,735 B1 * | 6/2002 | Beshai et al. | ............... | 370/230 |
| 6,412,000 B1 * | 6/2002 | Riddle et al. | ............... | 709/224 |
| 6,466,984 B1 * | 10/2002 | Naveh et al. | ............... | 709/228 |
| 6,690,645 B1 * | 2/2004 | Aweya et al. | ............... | 370/230 |
| 6,826,150 B1 * | 11/2004 | Bhattacharya et al. | ...... | 370/230 |
| 6,987,732 B2 | 1/2006 | Gracon et al. | ............... | 370/235.1 |
| 7,023,825 B1 | 4/2006 | Haumont et al. | ............... | 370/338 |
| 7,126,910 B1 * | 10/2006 | Sridhar | ............... | 370/229 |
| 7,158,480 B1 * | 1/2007 | Firoiu et al. | ............... | 370/235 |
| 2002/0101820 A1 * | 8/2002 | Gupta et al. | ............... | 370/229 |
| 2002/0165754 A1 * | 11/2002 | Tang et al. | ............... | 705/9 |
| 2003/0076848 A1 * | 4/2003 | Bremier-Barr et al. | ..... | 370/412 |
| 2003/0112829 A1 * | 6/2003 | Sridhar | ............... | 370/522 |
| 2003/0133466 A1 * | 7/2003 | Shimonishi | ............... | 370/412 |
| 2004/0179535 A1 * | 9/2004 | Bertagna | ............... | 370/395.21 |
| 2006/0159019 A1 | 7/2006 | Buskirk et al. | ............... | 370/235 |

* cited by examiner

*Primary Examiner*—Man U. Phan
(74) *Attorney, Agent, or Firm*—Campbell Stephenson LLP

(57) ABSTRACT

The present invention defines a method of unbiased policing of data flow in a network device. According to an embodiment of the present invention, the token bucket policer of the network device 'permits' (forwards) incoming packets even when the size of the token bucket is less than the size of the incoming packets. Permitting incoming packets that are larger than the token bucket ensures that incoming packets are not dropped because of the size of the incoming packets. Incoming packets are policed by TBP when the magnitude comparison of the token bucket and a predetermined constant value does not comply with the policing scheme defined for the incoming packets. When a packet is 'permitted' (forwarded), the size of the token bucket is reduced by an amount equal to the size of the packet.

97 Claims, 3 Drawing Sheets

UNBIASED TOKEN BUCKET

BACKGROUND OF THE INVENTION

1. Field of the Invention

The present invention relates to packet switching and routing systems, specifically to packet forwarding techniques.

2. Description of the Related Art

In data networks, Quality of Service (QoS) is a feature that allows network devices to drop packets on a selective basis to avoid or reduce congestion in the network. Generally, the elements of QoS include: "classification" and "policing". Packets are classified into different traffic classes according to a policy defined by the network administrator. For each class of traffic, packets are processed based on certain policing parameters set by the network-administrator using a given policing algorithm. When packets conform to assigned 'policing' parameters, the packets are referred to as "in-profile" packets and when the packets do not conform to the 'policing' parameters, the packets are referred to as "out-of-profile" packets. The network device forwards or 'permits' 'in-profile' packets. "Out-of-profile" packets are dropped or marked. Marking of "out-of-profile" packets lowers the priority of the packets and increases the probability that another network device in the network may drop the packets. Packets that are dropped or marked by the network device are referred to as "policed" packets.

Various algorithms exist to perform the policing of packets. Each algorithm can be implemented in a network device using a logic-module referred to as a 'policer'. The 'policer' performs certain computations according to an algorithm defined by the network administrator on all incoming packets. One such policer that limits the total number of bytes of all incoming packets in any defined interval of time is referred to as 'token bucket policer' or a 'leaky-bucket regulator'. A token bucket policer in a network device regulates the incoming data by limiting the data from a given incoming port to a predefined maximum amount during any given time interval. A user can contract with the network administrator to allow certain bit rate through the incoming port of a given network device. In such case, the policer of the network device limits the number of bits of the incoming port during any given time interval 'T' to: [(T*contract-rate)+burst size]. Where the 'contract-rate' is the mean bit rate agreed upon by the user and the network administrator and the burst is the maximum number of bits allowed above the contract rate during any given time.

In token bucket metaphor, a token bucket (state variable) represents the amount of data that any given port can transmit during a given time interval through a network device. The token bucket has a specified capacity. The value of the token bucket is increased according to a predefined bit rate. The maximum value of the token bucket is the maximum burst size contracted by the user. In token bucket policer implementation, the incoming data at a given port is measured and compared against the token bucket. When the value of the token bucket is greater than the size of an incoming packet, the incoming packet is 'permitted' to traverse through the network device. When the value of the token bucket is less than the size of the incoming packet, the incoming packet is 'policed'. When the packet is policed, the network device either drops the incoming packet or marks the incoming packet.

The conventional implementation of token bucket algorithm presents a problem when different sized packets arrive at a network device. When there is congestion in the network, the token bucket algorithm favors smaller sized packets over larger sized packets. Congestion occurs when the incoming data-rate is greater than the contract-rate. For example, when two users are coupled to a network device via a single port, both the users can send traffic on the ports. The traffic from both the users is policed according to the same policing scheme. During the congestion, if the users send different sized packets, the network device allows smaller sized packet to flow through and the larger sized packets are dropped. This can be illustrated by the following example.

Two users, A and B, are connected to a network device via a single port. The network device has one token bucket policer (TBP) for the port. The traffic from both the users is policed by the TBP. The TBP is configured to allow traffic with a contract rate of 10 Mbps. The traffic from user A includes 64 byte packets arriving at a speed of 11 Mbps. The traffic from user B includes 1K bytes packets arriving at 11 Mbps. The cumulative incoming traffic that is mapped to the TBP is 22 Mbps (11+11) which is greater than contract rate, 10 Mbps. Initially, the traffic from users A and B is permitted until a steady state is reached and bucket of the TBP is empty. The network device adds tokens into the token bucket according to the contracted rate. The incoming packets are held into an incoming buffer. When enough tokens are accumulated in the bucket, the 64 bytes packets from user A 'sneaks' through the network device because the packet size is smaller and the token bucket includes just enough tokens to allow the smaller packets. In such case, the 1K bytes packets from user B are always blocked (policed). Thus, once a steady state is reached, the traffic from user A is permitted (10 Mbps permitted, 1 Mbps policed) and the entire traffic from user B is policed.

Similarly, when a single token bucket policer is assigned to multiple incoming data flows with different sized packets (multiple users on single port, single user on multiple ports, multiple users on multiple ports or the like) and the incoming data is higher than the contract rate during a certain time window, the token bucket policer permits higher percentage of smaller sized packets as compared to larger sized packets during such time window.

A method of packet policing is needed that can eliminate the 'bias' for smaller sized packets and allow 'unbiased' forwarding of different sized packets during traffic congestion.

SUMMARY

In one embodiment, the present invention defines a method of processing one or more packets in a network. The method includes identifying at least one state variable, identifying at least one policy, determining whether a value of the state variable complies with the policy, wherein the determining further includes comparing a value of the state variable with at least one constant value, and performing one or more actions based on the determination. According to an embodiment of the present invention, the comparing further includes determining whether the value of the state variable is less than the constant value. In one embodiment, the comparing further includes determining whether the value of the state variable is one of greater than and equal to the constant value. In one embodiment, the comparing further includes determining whether the value of the state variable is one of less than and equal to the constant value. In one embodiment, the comparing further includes determining whether the value of the state variable is greater than the constant value.

The method further includes if the value of the state variable complies with the policy, forwarding the packet. The method further includes if the value of the state variable does not comply with the policy, policing the packet. According to an embodiment of the present invention, the policing further includes marking the packet. In one embodiment, the marking includes lowering a priority of the packet. In one embodiment of the present invention, the policing further includes dropping the packet. The method further includes receiving the packet. The method further includes adjusting the value of the state variable.

In one embodiment of the present invention, the adjusting the value of the state variable further includes subtracting a size of the packet from the value of the state variable. The method further includes increasing the value of the state variable according to a predetermined rate.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention defines a method, using token bucket algorithm, of unbiased policing of data flow in a network device. According to an embodiment of the present invention, during traffic congestion, the token bucket policer of the network device 'permits' (forwards) incoming packets even when the size of the token bucket is less than the size of the incoming packets. Permitting incoming packets that are larger than the token bucket ensures that incoming packets are not dropped because of the size of the incoming packets. The packet traffic is managed regardless of the size of the incoming packets. The network device continues to 'permit' (forward) incoming packets until the result of the magnitude comparison of the size of the token bucket and a predetermined constant value complies with a predetermined policing scheme. Incoming packets are policed by TBP when the magnitude comparison of the token bucket and a predetermined constant value does not comply with the policing scheme defined for the incoming packets. When a packet is 'permitted' (forwarded), the size of the token bucket is reduced by an amount equal to the size of the packet.

Network Device Architecture

Figure 1:
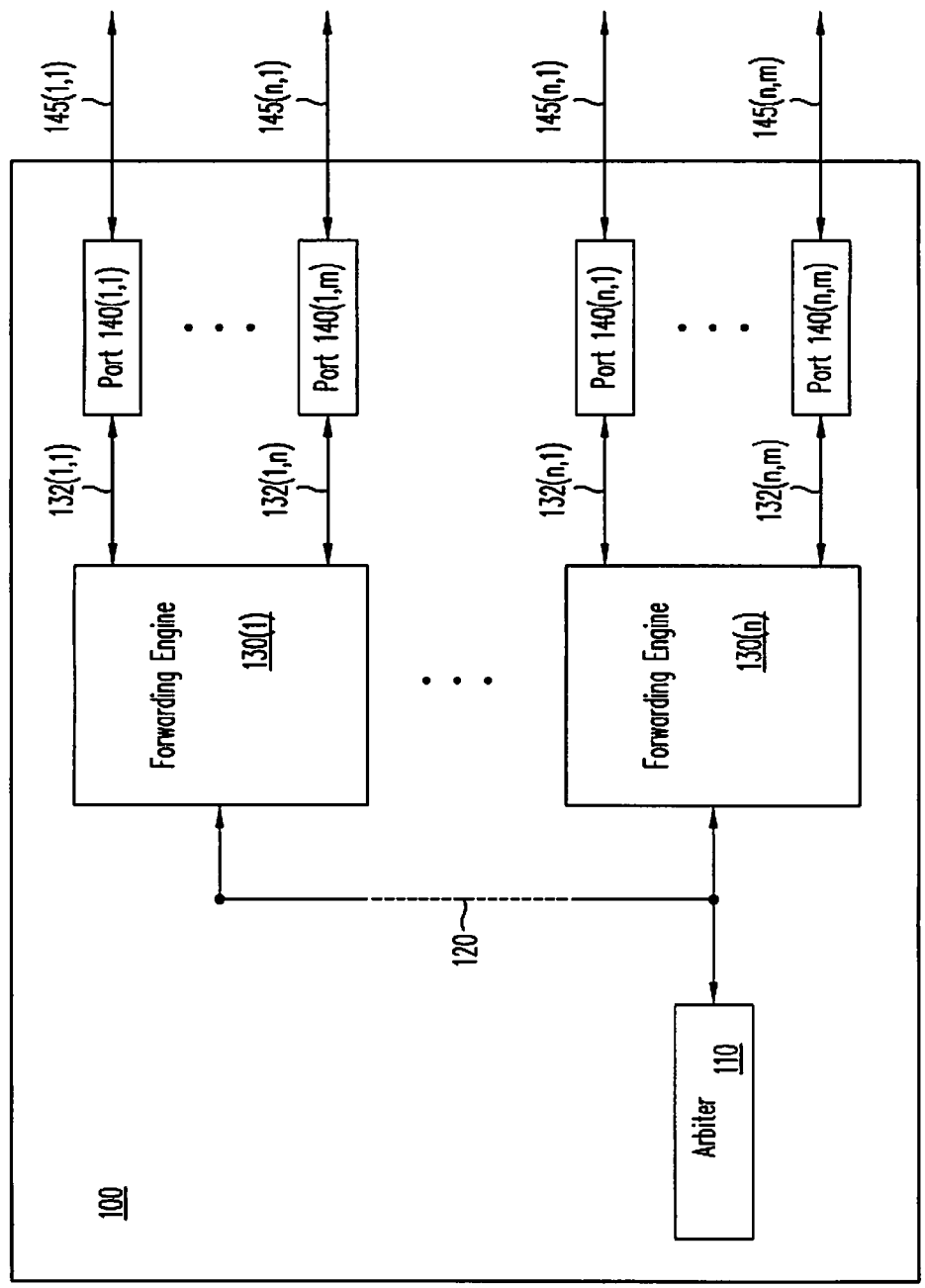
FIG. 1 illustrates a network device architecture according to an embodiment of the present invention.

FIG. 1 illustrates a network device architecture according to an embodiment of the present invention. Network device 100 includes an arbiter 110. Arbiter 110 is coupled to various elements of network device 100 via a link 120. Link 120 can be configured to carry variety of information (i.e., e.g., control, data, address or the like). Link 120 can be configured using any transport technology (i.e., e.g., high-speed bus, multiplexed links, switching fabric or the like). Network device 100 further includes 'n' forwarding engines, forwarding engines 130(1)-(n). Each forwarding engine is coupled to 'm' ports, ports (X, Y), where X represents the number of forwarding engine and Y represents the number of port. For example, port 140(1,1) is the first port coupled to forwarding engine 130(1), port 140(1, m) is mth port coupled to forwarding engine 130(1) and so on. Each forwarding engine is coupled to these ports via a link 132(X, Y), where X represents the number of forwarding engine and Y represents the number of port. For example, link 132(1, 1) couples forwarding engine 130(1) to port 140(1, 1), link 132(1, m) couples forwarding engine 130(1) to port 140(1, m) and so on. Each port couples to other network devices in the network via an input/output link 145(X, Y), where X represents the number of forwarding engine and Y represents the number of port. For example, link 145(1, 1) couples port 140(1,1), link 145(1, m) couples port 140(1, m) and so on.

Network device 100 receives packets from other network devices on links 145(X, Y). Forwarding engines 130(1)-(n) processes the incoming packets. Arbiter 110 provides link control arbitration to forwarding engines 130(1)-(n) for packet processing. After the incoming packets are processed, the forwarding engines 130(1)-(n) either forward or drop the incoming packets.

Figure 2:
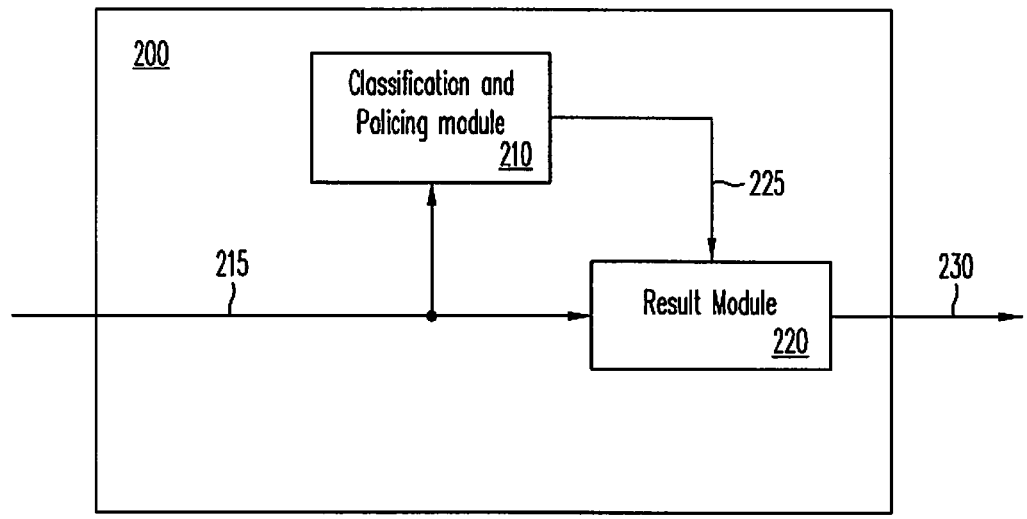
FIG. 2 illustrates an example of a forwarding engine according to an embodiment of the present invention.

FIG. 2 illustrates an example of a forwarding engine according to an embodiment of the present invention. Forwarding engine 200 corresponds, for example, to one or more of forwarding engines 130(1)-(n) of FIG. 1. Forwarding engine 200 includes control logic Classification and Policing (C&P) module 210. C&P module 210 can be configured using any appropriate control design technique that is capable of implementing the classification, policing and appropriate control functions required for forwarding the incoming packets described herein (i.e., e.g., processor, micro-controller, application specific integrated circuit or the like). C&P module 210 receives incoming packets on an input link 215. C&P is further coupled to various elements of forwarding engine 200 via a link 225. C&P module 210 provides forwarding control information to various elements of forwarding engine 200.

Forwarding engine 200 further includes a result module 220. Result module 240 receives incoming packets on link 215. Result module 220 forwards incoming packets processed by C&P module 210. When C&P module 210 complete the processing of the incoming packets, the incoming packets are forwarded to result module 220. Result module can get a destination index for the incoming packets from C&P module 210. Result module 220 determines the destination of the incoming packets and forwards the incoming packets on an output link 230. The structure and functioning of result module 220 are known in the art.

For illustration purposes, in the present example, links 215, 225 and 230 are shown as one-way links however, links 215, 225 and 230 can be configured as two way links. These links can be designed to carry various kinds of information (i.e., data, control, address or the like). Further, these links can be further configured using any transport technology (i.e., e.g., high-speed bus, multiplexed links, switching fabric or the like).

Figure 3:
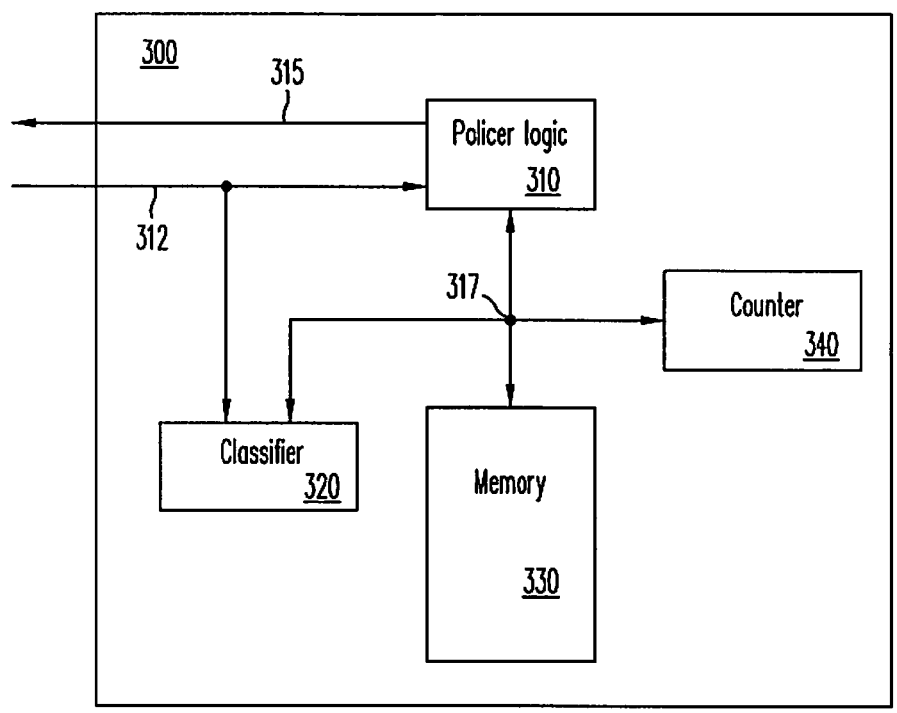
FIG. 3 illustrates an example of a Classification and Policer module according to an embodiment of the present invention.

FIG. 3 illustrates an example of a Classification and Policer (C&P) module 300 according to an embodiment of the present invention. C&P module 300 includes a policer logic 310. Policer logic 310 can be configured using any appropriate control logic (i.e., e.g., processor, micro-controller, application specific integrated circuit or the like). Policer logic 310 is coupled to various elements of C&P module 300 via a link 317. Policer logic 310 is further coupled to an incoming link 312 and an outgoing link 315. Packets are received on incoming link 312 and forwarded on outgoing link 315. For illustration purposes, while separate incoming and outgoing links are shown, however it will be apparent to one skilled in the art that these links can be configured in other ways (e.g., as multiplexed links). A classifier 320 is coupled to incoming link 312. Classifier 320 classifies incoming packets according to a predetermined packet classification scheme. Classification schemes are used to identify various aspects of the incoming packets (i.e., e.g., source, port, destination, quality of service, user identification or the like). Various classification schemes are known in the art. Classifier 320 can be configured using any appropriate control logic (i.e., e.g., content-addressable memory, stand-alone processor or the like).

A memory 330 stores the token bucket and predefined policing criteria for each class of the incoming packets. When the incoming packets are classified according to a predefined classification scheme (e.g., incoming packets with a specific QoS originating from a specific source or the like), policing logic 310 looks up the policing criteria assigned to the classified packets in memory 330. The policing criteria can include various factors (i.e., e.g., contracted data rate, burst size, bucket size, last update time, packet statistics, bucket states or the like or combination thereof). The policing criteria are used to police the classified packets according to a traffic scheme defined by the network administrator (e.g. for incoming packets with specific QoS originating from a specific source or the like). A counter 340 measures the time elapsed since last monitoring of data rate for a given port. Policer logic 310 uses the output of counter 340, the size of the incoming packet and the token bucket and policing parameters (e.g., burst, contract rate or the like) to make the policing decision.

Following pseudo code represents an implementation of token bucket algorithm according to an embodiment of the present invention.

elapsed_time=current_time−last_bucket_update_time;

last_bucket_update_time=current_time;  bucket+= (contract_rate*elapsed_time);

if (bucket >burst)
  bucket=burst;

if (bucket <0)// byte_count =size of packet
  police_packet( );

else {
  permit_packet( );

bucket−=byte_count;
}

According to another embodiment of the present invention, the size of the token bucket can be compared against a predetermined constant value and the packet can be policed based on the result of the comparison (equal to, greater than, less than, greater than or equal to, less than or equal to, or the like).

Figure 4:
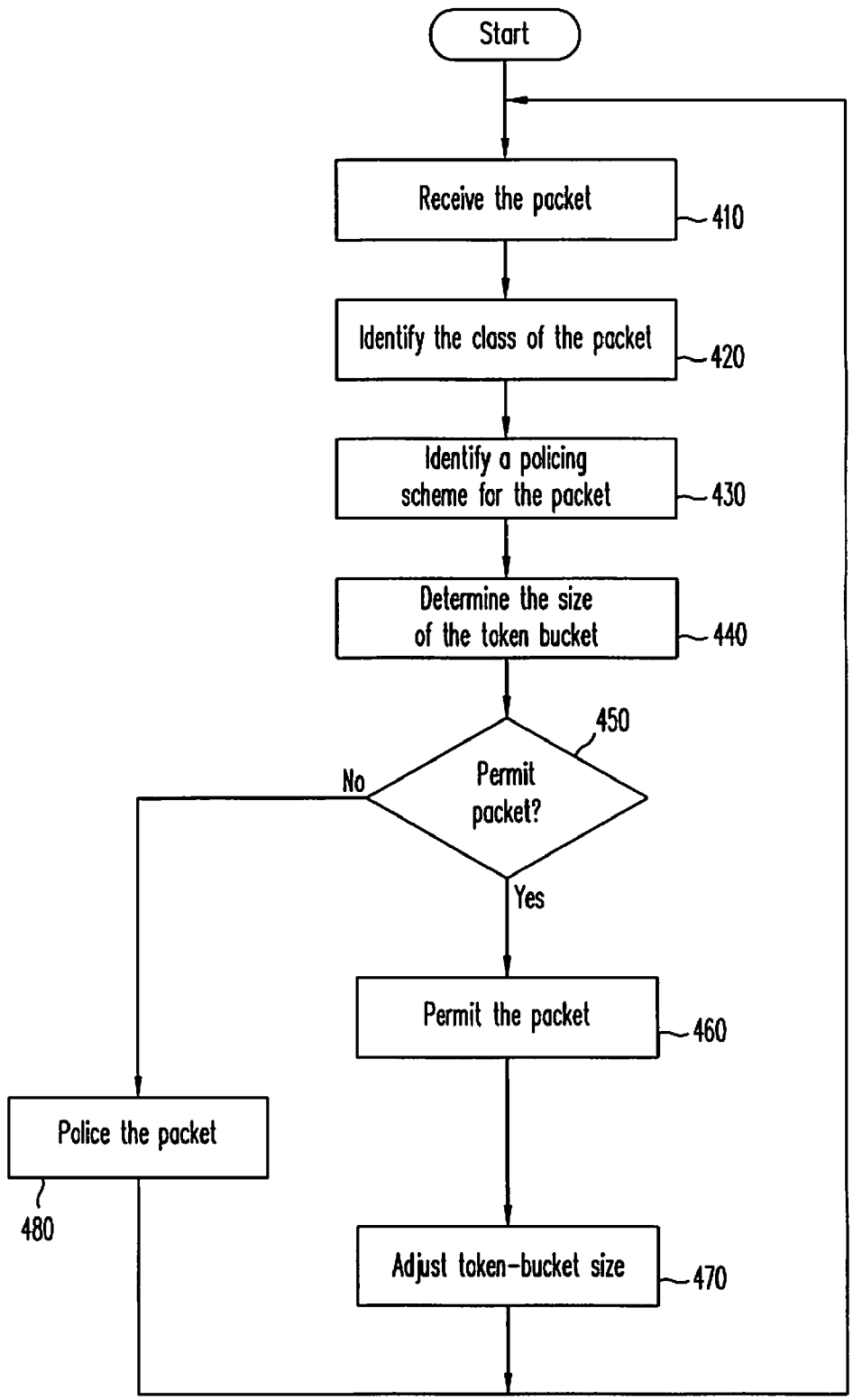
FIG. 4 is a flow chart illustrating the actions performed during the process of policing incoming packets in a network device according to an embodiment of the present invention.

FIG. 4 is a flow chart illustrating the actions performed during the process of policing incoming packets in a network device according to an embodiment of the present invention. Initially, the network device receives a packet (step 410). The network device identifies the class of the packet (step 420). The network device identifies a policing scheme for the packet based on the identified class (step 430). The network device determines the size of the token bucket (step 440). The size of the token bucket can be determined, for example, according to a contract rate agreed upon by the user and a traffic management scheme adopted by the network administrator. According to an embodiment of the present invention, the token bucket size is determined by determining the time elapsed between the receipt of two packet that use the same token bucket and multiplying it by the contracted data rate (elapsed-time*contract-rate) and adding it to the previous value of the token bucket. In another embodiment, the token bucket can be incremented by the contract_rate in every time unit. The maximum size of the token bucket is limited to a maximum burst size agreed upon by the user.

After calculating the token bucket size, the network device determines whether to permit the packet (step 450). The decision to permit the packet can be made by making one of several determinations. According to an embodiment of the present invention, the magnitude of the token bucket is compared against a predetermined constant. The result of the magnitude comparison is then used to determine whether the packet can be forwarded. The network administrator can determined the type of the magnitude comparison (equal to, greater than, less than, greater than or equal to, less than or equal to, or the like) between the size of the token bucket and the predetermined constant. The determination of the type of magnitude comparison can be made according to the policing scheme desired for the incoming packet.

If the result of the magnitude comparison complies with the predetermined policing scheme, the network device 'permits' the packet (step 460). When a packet is 'permitted', the size of the token bucket is reduced by the size of the 'permitted' packet. In one embodiment of the present invention, the token bucket size can be smaller than the packet size but as long as the magnitude comparison complies with the predetermined policing scheme, the packet is permitted. A packet that is larger than the token bucket size can be 'permitted' without being policed thus eliminating the 'bias' against larger size packets during the traffic congestion.

According to an embodiment of the present invention, the number of bytes that can be permitted in any arbitrary time-interval T can be [(T*contract-rate)+burst size+maximum transfer unit]. Where the 'contract-rate' is the mean bit rate agreed upon by the user and the network administrator. The burst size is the maximum number of bits allowed for the user at any given time and maximum transfer unit is the largest packet size allowed by the protocol employed in the network. After 'permitting' the packet, the network device adjusts the token bucket size (e.g., reducing the token bucket size by an amount equal to the 'permitted' packet size or the like) (step 470). The network device then proceeds to receive the next packet (step 410).

If the result of the magnitude comparison does not comply with the predetermined policing scheme, the network device 'polices' the packet (step 480). Policing can include various actions according to a policing scheme adopted by the network administrator (i.e., e.g., lowering the priority of the packet, dropping the packet or the like). The network device then proceeds to receive the next packet (step 410).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of processing a packet in a network comprising:
    identifying a token bucket of a plurality of token buckets;
    identifying a policy of a plurality of policies;
    determining whether a value of said token bucket complies with said policy, wherein said determining further comprises comparing said value of said token bucket with at least one constant value, and wherein said comparing further comprises determining one of: whether said value of said token bucket is greater than said constant value, whether said value of said token bucket is less than said constant value, whether said value of said token bucket is one of greater than and equal to said constant value, and whether said value of said token bucket is one of less than and equal to said constant value; and
    performing one or more actions based on an outcome of said determining, 2. The method of claim 1, wherein said token bucket is identified according to one or more characteristics of said packet.

3. The method of claim 1, wherein said policy is identified according to said characteristics of said packet.

4. The method of claim 2, wherein one of said characteristics of said packet is a class of service.

5. The method of claim 1, wherein said comparing further comprises:
    determining whether said value of said token bucket is less than said constant value.

6. The method of claim 1, wherein said comparing further comprises:
    determining whether said value of said token bucket is one of greater than and equal to said constant value.

7. The method of claim 1, wherein said comparing further comprises:
    determining whether said value of said token bucket is one of less than and equal to said constant value.

8. The method of claim 1, wherein said comparing further comprises:
    determining whether said value of said token bucket is greater than said constant value.

9. The method of claim 1, wherein each one of said plurality of token buckets has a predetermined maximum size.

10. The method of claim 1, further comprising:
    if said value of said token bucket complies with said policy, forwarding said packet.

11. The method of claim 1, further comprising:
    if said value of said token bucket does not comply with said policy, policing said packet.

12. The method of claim 11, wherein said policing further comprising:
    marking said packet.

13. The method of claim 12, wherein said marking comprises:
    lowering a priority of said packet.

14. The method of claim 11, wherein said policing further comprising:
    dropping said packet.

15. The method of claim 1, wherein said plurality of policies are predetermined.

16. The method of claim 15, wherein one of said plurality of policies determines a number of said plurality of packets forwarded in a given time.

17. The method of claim 1, further comprising:
    receiving said packet.

18. The method of claim 17, further comprising:
    adjusting said value of said token bucket.

19. The method of claim 18, wherein said adjusting said value of said token bucket further comprising:
    subtracting a size of said packet from said value of said state variable.

20. The method of claim 19, further comprising:
    increasing said value of said token bucket according to a predetermined rate.

21. A network traffic controller comprising:
    a policer, said policer is configured to
    determine whether a value of a token bucket of a plurality of token buckets complies with one of a plurality of policies by comparing a value of said token bucket with at least one constant value, wherein said comparing further comprises determining one of: whether said value of said token bucket is greater than said constant value, whether said value of said token bucket is less than said constant value, whether said value of said token bucket is one of greater than and equal to said constant value, and whether said value of said token bucket is one of less than and equal to said constant value.

22. The network traffic controller of claim 21, wherein said policer is further configured to
    determine whether said value of said token bucket is less than said constant value.

23. The network traffic controller of claim 21, wherein said policer is further configured to
    determine whether said value of said token bucket is one of greater than and equal to said constant value.

24. The network traffic controller of claim 21, wherein said policer is further configured to
    determine whether said value of said token bucket is one of less than and equal to said constant value.

25. The network traffic controller of claim 21, wherein said policer is further configured to
    determine whether said value of said token bucket is greater than said constant value.

26. The network traffic controller of claim 21, further comprising:
    a classifier coupled to said policer, wherein said classifier is configured to determine a plurality of characteristics of a first packet.

27. The network traffic controller of claim 26, wherein one of said characteristics is a class of said first packet.

28. The network traffic controller of claim 27, further comprising:
a first memory coupled to said policer, said first memory is configured to store said plurality of policies; and
a counter coupled to said policer, wherein said counter is configured to determine time elapsed between said first packet and a second packet.

29. The network traffic controller of claim 28, wherein a forwarding engine comprises said network traffic controller.

30. The network traffic controller of claim 29, wherein said forwarding engine further comprises:
a result module coupled to said network traffic controller, said result module is configured to forward a plurality of incoming packets.

31. The network traffic controller of claim 30, wherein a network element comprises said forwarding engine.

32. A network element comprising:
a processor; and
a plurality of forwarding engines coupled to said processor, at least one of said forwarding engines comprising a network traffic controller, wherein said network traffic controller is configured to
determine whether a value of a token bucket complies with a policy, wherein said determining further comprises comparing a value of said token bucket with at least one constant value wherein said comparing further comprises determining one of: whether said value of said token bucket is greater than said constant value, whether said value of said token bucket is less than said constant value, whether said value of said token bucket is one of greater than and equal to said constant value, and whether said value of said token bucket is one of less than and equal to said constant value; and
perform one or more actions based on whether said value of said token bucket complies with said policy.

33. The network element of claim 32, wherein said network traffic controller is further configured to
identify said token bucket; and
identify said policy.

34. The network element of claim 33, wherein said token bucket is identified according to one or more characteristics of a packet.

35. The network element of claim 33, wherein said policy is identified according to said characteristics of said packet.

36. The network element of claim 34, wherein one of said characteristics of said packet is a class of service.

37. The network element of claim 32, wherein said network traffic controller is further configured to
determine whether said value of said token bucket is less than said constant value.

38. The network element of claim 32, wherein said network traffic controller is further configured to
determine whether said value of said token bucket is one of greater than and equal to said constant value.

39. The network element of claim 32, wherein said network traffic controller is further configured to
determine whether said value of said token bucket is one of less than and equal to said constant value.

40. The network element of claim 32, wherein said network traffic controller is further configured to
determine whether said value of said token bucket is greater than said constant value.

41. The network element of claim 32, wherein each one of said plurality of token buckets has a predetermined maximum size.

42. The network element of claim 32, wherein said network traffic controller is further configured to
if said value of said token bucket complies with said policy, forward a packet.

43. The network element of claim 32, wherein said network traffic controller is further configured to
if said value of said token bucket does not comply with said policy, police a packet.

44. The network element of claim 43, wherein said network traffic controller is further configured to
mark said packet.

45. The network element of claim 44, wherein said network traffic controller is further configured to
lower a priority of said packet.

46. The network element of claim 43, wherein said network traffic controller is further configured to
drop said packet.

47. The network element of claim 32, wherein said policy is predetermined.

48. The network element of claim 47, wherein said policy determines a number of said plurality of packets forwarded in a given time.

49. The network element of claim 32, wherein said network traffic controller is further configured to
receive a packet.

50. The network element of claim 49, wherein said network traffic controller is further configured to
adjust said value of said token bucket.

51. The network element of claim 50, wherein said network traffic controller is further configured to
subtract a size of said packet from said value of said token bucket.

52. The network element of claim 51, wherein said network traffic controller is further configured to
increase said value of said token bucket according to a predetermined rate.

53. A network element comprising:
means for identifying a token bucket of a plurality of token buckets;
means for identifying a policy of a plurality of policies;
means for determining whether a value of said token bucket complies with said policy, wherein said determining further comprises comparing a value of said token bucket with at least one constant value, wherein said comparing further comprises determining one of: whether said value of said token bucket is greater than said constant value, whether said value of said token bucket is less than said constant value, whether said value of said token bucket is one of gReater than and equal to said constant value, and whether said value of said token bucket is one of less than and equal to said constant value; and
means for performing one or more actions based on an outcome of said determining.

54. The network element of claim 53, wherein said token bucket is identified according to one or more characteristics of a packet.

55. The network element of claim 54, wherein said policy is identified according to said characteristics of said packet.

56. The network element of claim 54, wherein one of said characteristics of said packet is a class of service.

57. The network element of claim 53, further comprising:
means for determining whether said value of said token bucket is less than said constant value.

58. The network element of claim 53, further comprising:
means for determining whether said value of said token bucket is one of greater than and equal to said constant value.

59. The network element of claim 53, further comprising:
means for determining whether said value of said token bucket is one of less than and equal to said constant value.

60. The network element of claim 53, further comprising:
means for determining whether said value of said token bucket is greater than said constant value.

61. The network element of claim 53, wherein each one of said plurality of token buckets has a predetermined maximum size.

62. The network element of claim 53, further comprising:
means for forwarding a packet if said value of said token bucket complies with said policy.

63. The network element of claim 53, further comprising:
means for policing a packet if said value of said token bucket does not comply with said policy.

64. The network element of claim 63, further comprising:
means for marking said packet.

65. The network element of claim 64, further comprising:
means for lowering a priority of said packet.

66. The network element of claim 63, further comprising:
means for dropping said packet.

67. The network element of claim 53, wherein said plurality of policies are predetermined.

68. The network element of claim 67, wherein one of said plurality of policies determines a number of said plurality of packets forwarded in a given time.

69. The network element of claim 53, further comprising:
means for receiving a packet.

70. The network element of claim 69, further comprising:
means for adjusting said value of said token bucket.

71. The network element of claim 70, further comprising:
means for subtracting a size of said packet from said value of said token bucket.

72. The network element of claim 71, further comprising:
means for increasing said value of said token bucket according to a predetermined rate.

73. A computer program product for processing a packet in a network, encoded in computer readable media, said program product comprising a set of instructions executable on a computer system, said set of instructions is configured to
identify a token bucket of a plurality of token buckets;
identify a policy of a plurality of policies;
determine whether a value of said token bucket complies with said policy, wherein said determining further comprises comparing a value of said token bucket with at least one constant value, wherein said comparing further comprises determining one of: whether said value of said token bucket is greater than said constant value, whether said value of said token bucket is less than said constant value, whether said value of said token bucket is one of greater than and equal to said constant value, and whether said value of said token bucket is one of less than and equal to said constant value; and
perform one or more actions based on said determination.

74. The computer program product of claim 73, wherein said token bucket is identified according to one or more characteristics of said packet.

75. The computer program product of claim 74, wherein said policy is identified according to said characteristics of said packet.

76. The computer program product of claim 74, wherein one of said characteristics of said packet is a class of service.

77. The computer program product of claim 73, wherein said set of instructions is further configured to
determine whether said value of said token bucket is less than said constant value.

78. The computer program product of claim 73, wherein said set of instructions is further configured to
determine whether said value of said token bucket is one of greater than and equal to said constant value.

79. The computer program product of claim 73, wherein said set of instructions is further configured to
determine whether said value of said token bucket is one of less than and equal to said constant value.

80. The computer program product of claim 73, wherein said set of instructions is further configured to
determine whether said value of said token bucket is greater than said constant value.

81. The computer program product of claim 73, wherein each one of said plurality of token buckets has a predetermined maximum size.

82. The computer program product of claim 73, wherein said set of instructions is further configured to:
if said value of said token bucket complies with said policy, forward said packet.

83. The computer program product of claim 73, wherein said set of instructions is further configured to
if said value of said token bucket does not comply with said policy, police said packet.

84. The computer program product of claim 83, wherein said set of instructions is further configured to
mark said packet.

85. The computer program product of claim 84, wherein said set of instructions is further configured to
lower a priority of said packet.

86. The computer program product of claim 83, wherein said set of instructions is further configured to
drop said packet.

87. The computer program product of claim 73, wherein said plurality of policies are predetermined.

88. The computer program product of claim 87, wherein one of said plurality of policies determines a number of said plurality of packets forwarded in a given time.

89. The computer program product of claim 73, wherein said set of instructions is further configured to
receive said packet.

90. The computer program product of claim 89, wherein said set of instructions is further configured to
adjust said value of said token bucket.

91. The computer program product of claim 90, wherein said adjusting said value of said token bucket said set of instructions is further configured to:
subtracting a size of said packet from said value of said token bucket.

92. The computer program product of claim 91, wherein said set of instructions is further configured to
increase said value of said token bucket according to a predetermined rate.

93. The method of claim 1, wherein said performing one or more actions based on an outcome of said determining comprises:
permitting said packet, wherein said value of said token bucket is less than a size of said packet.

94. The network traffic controller of claim 21, wherein said policer is further configured to:
   permit said packet if said value of said token bucket complies with said one of said plurality of policies, wherein said value of said token bucket is less than a size of said packet.

95. The network element of claim 32, wherein said network traffic controller is further configured to:
   permit said packet if said value of said token bucket complies with said policy, wherein said value of said token bucket is less than a size of said packet.

96. The network element of claim 53, wherein said means for performing one or more actions based on an outcome of said determining comprises:
   means for permitting said packet if said value of said token bucket complies with said policy, wherein said value of said token bucket is less than a size of said packet.

97. The computer program product of claim 73, wherein said set of instructions is configured to:
   permit said packet if said value of said token bucket complies with said policy, wherein said value of said token bucket is less than a size of said packet.

* * * * *